(12) United States Patent
Dillon et al.

(10) Patent No.: US 8,600,571 B2
(45) Date of Patent: Dec. 3, 2013

(54) ENERGY OPTIMIZATION SYSTEM

(75) Inventors: Jim Dillon, Coopersburg, PA (US);
Ronald Blagus, Sylvania, OH (US);
Stephen Parr, Burlington, CT (US);
Venkat Iyer, Iselin, NJ (US); Alan Houghton, Providence, RI (US)

(73) Assignee: Honeywell International Inc., Morristown, NJ (US)

( * ) Notice: Subject to any disclaimer, the term of this patent is extended or adjusted under 35 U.S.C. 154(b) by 1163 days.

(21) Appl. No.: 12/142,528

(22) Filed: Jun. 19, 2008
(Under 37 CFR 1.47)

(65) Prior Publication Data

US 2009/0319090 A1 Dec. 24, 2009

(51) Int. Cl.
*G05D 17/00* (2006.01)
*G06F 17/00* (2006.01)

(52) U.S. Cl.
USPC ........................................... 700/291; 700/295

(58) Field of Classification Search
USPC .......... 700/286, 291, 295–297; 323/299, 304; 705/7.29, 7.31, 412
See application file for complete search history.

(56) References Cited

U.S. PATENT DOCUMENTS

| 5,621,654 | A  | * | 4/1997  | Cohen et al. ................... 700/287 |
| 5,924,486 | A  | * | 7/1999  | Ehlers et al. ................... 165/238 |
| 6,098,893 | A  |   | 8/2000  | Berglund et al. |
| 6,169,979 | B1 | * | 1/2001  | Johnson .......................... 705/412 |
| 6,255,805 | B1 | * | 7/2001  | Papalia et al. .................. 323/207 |
| 6,671,585 | B2 | * | 12/2003 | Lof et al. ...................... 705/36 R |
| 6,745,105 | B1 | * | 6/2004  | Fairlie et al. .................. 700/273 |
| 7,069,161 | B2 | * | 6/2006  | Gristina et al. ................. 702/61 |
| 7,406,364 | B2 |   | 7/2008  | Andren et al. |
| 7,451,017 | B2 | * | 11/2008 | McNally ........................ 700/291 |
| 7,741,730 | B2 | * | 6/2010  | Level et al. .................... 307/20 |
| 7,818,270 | B2 | * | 10/2010 | Carey et al. .................... 705/412 |
| 7,870,746 | B2 | * | 1/2011  | Vandor .......................... 62/45.1 |
| 7,873,442 | B2 | * | 1/2011  | Tsui .............................. 700/291 |
| 7,894,943 | B2 | * | 2/2011  | Sloup et al. .................... 700/276 |
| 8,103,465 | B2 | * | 1/2012  | Brzezowski et al. ........... 702/62 |
| 2003/0009401 | A1 | * | 1/2003 | Ellis ............................. 705/35 |
| 2003/0023540 | A2 | * | 1/2003 | Johnson et al. ................. 705/37 |
| 2005/0138929 | A1 | * | 6/2005 | Enis et al. ..................... 60/641.8 |
| 2006/0167591 | A1 |   | 7/2006 | McNally |
| 2007/0125417 | A1 | * | 6/2007 | Johanson et al. ............. 136/244 |
| 2007/0179855 | A1 | * | 8/2007 | Rueda et al. ................... 705/14 |
| 2008/0033786 | A1 | * | 2/2008 | Boaz et al. ..................... 705/10 |
| 2008/0046387 | A1 | * | 2/2008 | Gopal et al. ................... 705/412 |

(Continued)

FOREIGN PATENT DOCUMENTS

DE 10226755 A1 * 2/2004
WO WO03023675 A2 * 3/2003

*Primary Examiner* — M. N. Von Buhr
(74) *Attorney, Agent, or Firm* — Seager Tufte & Wickhem LLC.

(57) ABSTRACT

A system for optimizing a usage of energy based on cost, carbon footprint, and/or other criteria. The usage may be optimized for the next day or more. The optimization may deal with renewable energy, grid energy and stored energy. Various inputs may be considered for optimization, which could include energy costs, weather forecasts, characteristics of renewable energy, the load and storage, and other items. The optimizer may use equipment models with numerical transfer functions to take inputs and provide optimized estimates for the next day or so of energy usage. The outputs of the models may go to an optimization algorithms module for providing an output based on the inputs. The output may provide control information for the selection and amounts of the different types of energy in a scheduled manner.

21 Claims, 3 Drawing Sheets

(56) References Cited

U.S. PATENT DOCUMENTS

| | | |
|---|---|---|
| 2008/0071705 A1* | 3/2008 | Enis et al. .................... 705/412 |
| 2008/0105045 A1 | 5/2008 | Woro |
| 2008/0272653 A1* | 11/2008 | Inoue et al. .................... 307/47 |
| 2009/0313056 A1 | 12/2009 | Beckhuis |
| 2009/0313083 A1 | 12/2009 | Dillon et al. |
| 2010/0076835 A1* | 3/2010 | Silverman ................... 705/14.33 |
| 2011/0208365 A1* | 8/2011 | Miller .......................... 700/291 |
| 2011/0218683 A1* | 9/2011 | Ben-Yaacov et al. ......... 700/278 |

\* cited by examiner

ENERGY OPTIMIZATION SYSTEM

BACKGROUND

The present invention pertains to energy usage and particularly it pertains to management of energy usage. More particularly the invention pertains to usage management of various kinds of energy.

SUMMARY

The present invention is a system for optimizing use of renewable energy and conventional energy in a balanced fashion to minimize cost, carbon footprint and/or other energy-pertinent criteria for a predicted load. The optimization of energy usage may draw from characterizations, properties and factors of which some are forecasted. Results of the optimization may provide a schedule of usage in terms of amount and kind for the next day or so. This schedule may be implemented with a control of energy provided to a load.

DESCRIPTION

Facilities or buildings that use renewable energy sources (solar, wind, geothermal or biomass) may also require fossil fuel sources and/or grid produced electricity to meet their total energy demand. These facilities may have a need to dynamically optimize their energy usage to deliver on a basis or criterion of either the lowest energy cost, or the lowest or smallest carbon footprint, or a balance of these and/or other criteria. By adding an energy storage capability for the renewable energy source, new options may be presented for when to generate and supply the renewable energy to the facility (i.e., load). This optimization approach may require a dedicated solution to automatically provide an appropriate balance between renewable energy and conventional energy to maintain, for example, the lowest cost and smallest carbon footprint.

The present system may obtain input on the cost of grid/fossil fuel energy and the forecasted facility loads to determine an optimum use of renewable energy assets during the next 24 to 48 hour or so period. A use of energy storage may enable development of more extensive operational strategies that deliver the renewable energy at an optimum time that is or is not coincident with the renewable energy asset availability.

Figure 1:
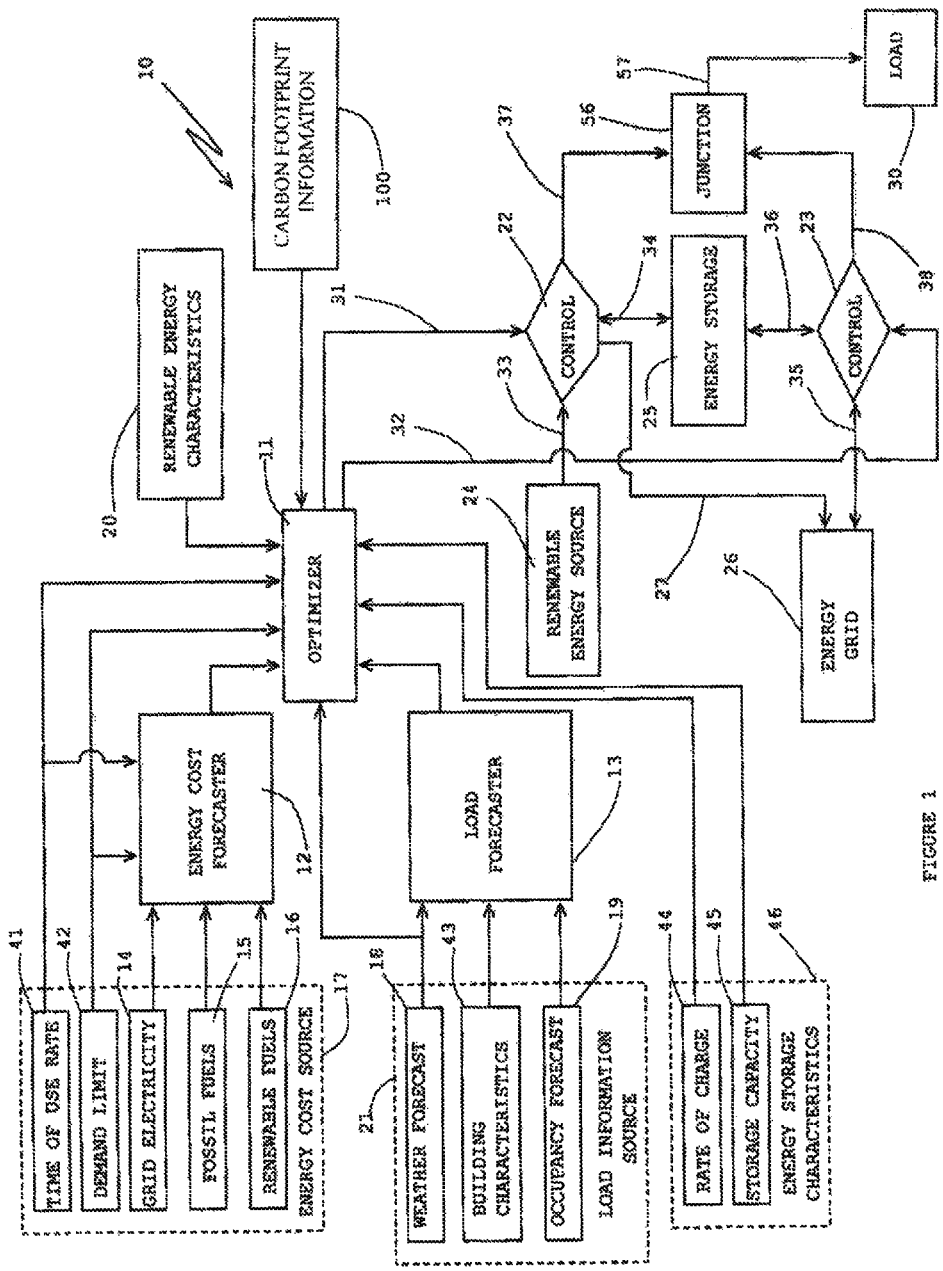
FIG. 1 is a diagram of an energy optimization system.

Per the block diagram of FIG. 1, a renewable energy optimization system 10 may take inputs from an "energy cost forecaster" 12 and a "load forecaster" 13, including other information sources, to determine the most cost effective or most carbon efficient approach for meeting facility or building loads at any given point of time. The optimization algorithms of an optimizer 11 may take into account whether it is best to produce renewable energy and use it, produce the energy and store it, buy energy from a grid 26 or pull energy from storage 25 to meet facility or building load 30 demands. Algorithms for optimizer 11 may be custom designed or obtained off the shelf according to the needs for building models and effecting transfer functions in view of the inputs and outputs for optimization in accordance with the present system 10 as disclosed herein.

Relative to FIG. 1, optimizer 11, for a start, may take inputs from the energy cost forecaster 12 and the load forecaster 13 to help determine the most cost effective and/or carbon efficient approach for meeting building loads or energy needs at any particular point in time. Inputs to the energy cost forecaster 12 may include rates for grid electricity 14, fossil fuels 15 and renewable fuels 16. Other information about these sources 14-16 of energy may be provided to the energy cost forecaster 12. Time of use rate 41 and demand limit 42 may be provided for grid electricity to energy cost forecaster 12 and optimizer 11. Such sources of information may be referred to as an energy cost source 17. With information from source 17, the energy cost forecaster 12 may provide day-ahead rate information about the cost of energy. A day-ahead period may cover the next 24 to 48 or so hours. The carbon footprint 100 of each energy type may be provided to optimizer 11 and be accounted for while doing an optimization of energy usage.

A weather forecast module 18, occupancy forecast module 19 and building characteristics 43 may provide information such as predicted weather conditions, occupancy or use of a building or facility, and building structure, size, thermal characteristics and so forth, which are of concern to the present system 10, to the load forecaster 13. Weather forecast 18 may also be provided to optimizer 11. Modules 18, 19 and 43 may be referred to as a load information source 21. Outputs from the energy cost forecaster 12, the load forecaster 13 and weather forecast module 18 may go to the optimizer 11. A rate of charge 44 and storage capacity 45 from energy storage characteristics 46 may be provided to optimizer 11. Renewable energy characteristics 20 may be provided to optimizer 11. Optimizer 11 may use algorithms which take into account information from the forecasters 12 and 13, energy storage characteristics 46 and renewable energy characteristics 20, to make and provide an output of certain energy-related determinations. Such determinations may indicate whether it is best to produce renewable energy from source 24 and use it or store it, or to buy or sell energy from or to a grid 26 or pull energy from storage 25 to meet the building or facility load 30 demand or need.

The output of optimizer 11 may go to control mechanisms 22 and 23 via lines 31 and 32, respectively. Control of each mechanism may be like a valve controlling a flow of energy from various sources into one conveyance line to a load 30 and/or storage 25. Mechanism 22 may receive a signal on a control line 31 from optimizer 11 indicating whether renewable energy from source 24 or from storage 25, or a combination of renewable energy from source 24 and storage 25 should be provided to a building or facility load 30. Incidentally, load 30 may be other than a building or facility that uses energy. Mechanism 23 may receive a signal on a control line 32 from optimizer 11 indicating whether conventional energy from grid 26 or from storage 25, or a combination of conventional energy from grid 26 and renewable energy from storage 25 should be provided to load 30. Energy from grid 26 may be taken at low prices, when plenty of energy is available, and conveyed to storage 25. On the other hand, when grid energy is expensive, energy may be taken from storage 25 and conveyed to grid 26 for credit or sold at currently high prices. Also, renewable energy may be conveyed from source 24 to grid 26 for credit or sale.

The directions of energy flow may be noted by conveyance lines 27, 33, 34, 35 and 36. Line 33 may be one way in that renewable energy could come from the source 24 to mechanism 22. Line 27 may be one way in that renewable energy could come from source 24 via mechanism 22 as controlled by optimizer 11 to energy grid 26. Line 34 may be two-way in that renewable energy could be put in storage 25 or energy be drawn from storage 25 for use. Line 35 may be two-way in that conventional energy could be drawn from grid 26, or energy may be provided to grid 26. Line 36 may be two-way in that energy could be drawn from storage 25 to supplement conventional energy to load 30, or energy could be drawn from storage 25 to grid 26, or energy may be drawn from grid 26 and put in storage 25. Both directions of movement of energy between storage 25 and grid 26 may help level off significant changes in demand and prices of grid energy. Optimizer 11 may coordinate and control the movement of energy via line 31 and mechanism 22 through lines 27, 33, 34 and 37. Also, the movement of energy through lines 35, 36 and 38 may be coordinated and controlled by optimizer 11 via line 32 and mechanism 23.

Lines 37 and 38 may go to a junction mechanism 56 where conventional, renewable and stored energy go before being provided to load 30. If energy is provided simultaneously on lines 37 and 38 to mechanism 56, then both energies may be electrically combined with junction mechanism 56 for conveyance as energy on line 57 to load 30. If so, then energy from different sources may be provided in various proportions at the same time to load 30. However, optimizer 11 may permit energy to junction 56 to be just on line 37 or 38 rather on both lines at the same time with signals via lines 31 and 32 to control mechanisms 22 and 23, respectively. Optionally, a control line (not shown) may go from optimizer 11 to junction 56. Also, a sensing line (not shown) may optionally be connected from load 30 to optimizer 11. The sensing line could be used for detecting temperature, energy usage, and/or other factors at load 30.

Figure 2:
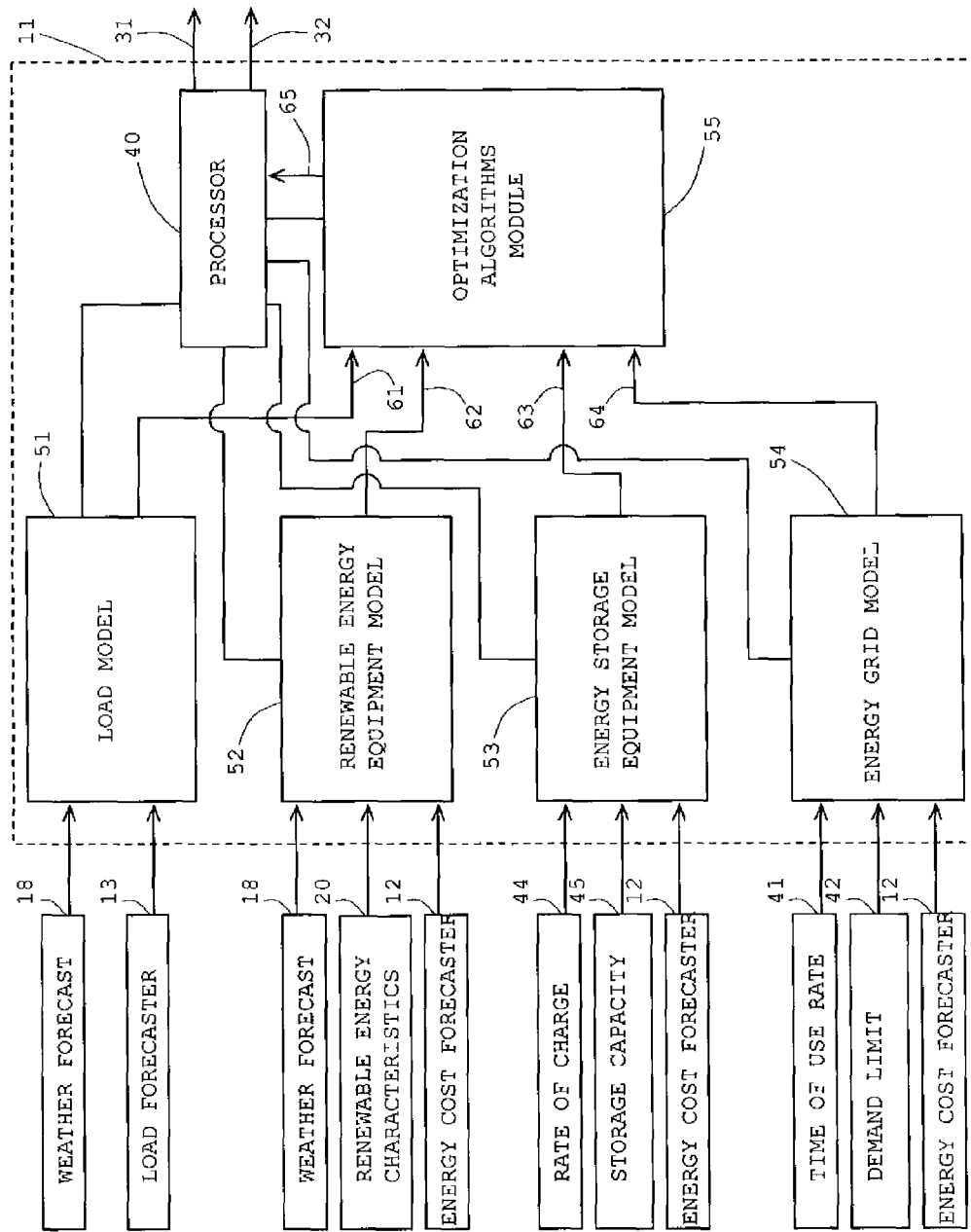
FIG. 2 is a diagram of an optimizer of the energy optimization system.

Optimizer 11 may have a processor 40 (PC or embedded) that processes multiple input data sources using numerical methods to determine the best input and output configuration to achieve optimum energy usage (FIG. 2). The optimizer in conjunction with the remaining portion of system 10 may be configured to optimize different variables, such as energy cost, carbon footprint, energy demand limit, and so forth.

An equipment model, e.g., renewable energy equipment model 52 or energy storage equipment model 53 (FIG. 2), may describe the configuration, characteristics and dynamic capabilities of the equipment to be optimized. An equipment model may represent the renewable energy generation source, the energy storage device, and other energy devices that may be included in the system, such as a diesel generator set, gas turbine, and so on. For each piece of equipment, the equipment model may identify the input parameters, and the mathematical relationship (e.g., transfer function) between the input and the output. With each piece of equipment modeled, a system model may be developed that describes the overall dynamic inter-relationships between the equipment and the control system. With the model developed, optimizer 11 may use numerical optimization methods to evaluate the possible scenarios for projected inputs over the next 24 to 48 hour period so as to determine the optimum configuration and operational parameters for operation of the system 10 over that period. The equipment models for the devices, e.g., renewable energy source 24 and energy storage 25 (FIG. 1), may include parameters relating to their rate of energy generation and storage, the rate of discharge, the cost of energy production, and other parameters as appropriate for each of the specific devices.

FIG. 2 is a diagram of an example of optimizer 11 which may be viewed in conjunction of the system shown in FIG. 1. In the present approach, electricity may be supplied by the grid 26, a solar photo voltaic cell renewable energy source 24 that provides DC power, and a battery-based energy storage device 25. Conversions between AC and DC power may be provided by system 10 as needed. System 10 may provide 24-hour per day continuous operation at a minimum energy cost. Optimizer 11 may determine for a given load demand and weather forecast an optimum operating configuration of the energy assets over an upcoming 24 to 48 hour period and provide this information for system 10 to automatically control the assets in accordance with an optimum schedule.

In the present example, for instance, energy from the solar PV array of source 24 may have the lowest net cost, followed by the energy storage device 25 and the grid 26, in that order, depending on which energy source was used to charge storage device 25. If optimizing is based on energy cost, then the optimizer 11 may try to maximize the use of the solar PV energy to drive the load 30, particularly at times when the weather forecast 18 indicates a maximum of available solar radiance which is sufficient to meet the expected load 30 as indicated by forecaster 13. Likewise, at times when the solar PV array output is reduced, optimizer 11 may need to determine if a reduction of solar PV output is best used to charge the energy storage system 25, or to reduce the amount of power from grid 26 required to meet the load 30 conditions. A number of different possible permutations of inputs and outputs may require a mathematical optimization to arrive at the optimum solution in real time.

Since the optimizer 11 is operated in a processor 40, the models 52 and 53 may be developed using a graphical modeling tool which configures the relationships between the equipment assets using drag and drop modules, and enables the dynamic relationship between the asset inputs and outputs to be modeled by connecting the assets together through the appropriate inputs and outputs. The graphical modeling tool may typically be run off-line, where upon a model could be compiled and downloaded to processor 40 for execution through the control system.

Model 52 or 53 may be run (i.e., optimized) on a user selectable frequency, which could be as often as every 15 minutes to once per day, depending on the application and the rate of change expected within the inputs (grid price, weather, building load). After optimization commands are generated to execute the optimum configuration automatically by the control system, a graphical schedule may also be generated thereby providing a display for the operator. The contents of the display may be printed for distribution to appropriate users.

A block diagram in FIG. 2 shows optimizer 11 with its primary components, and corresponding inputs and outputs which are generally shown in FIG. 1. A load module 51 may have inputs from load forecast 13 and weather forecast 18. The inputs may be processed through a transfer function to result in amounts of load requirements at an output 61. Output 61 is graphically shown in FIG. 3a in terms of cost versus time in hours projected forwarded from the present. Output 61 may go to optimization algorithms module 55. Module 55 may take various inputs from the models and process them into an output 65 for optimized control of energy resources.

Renewable energy model 52 may have inputs from the energy cost forecaster 12, weather forecast 18 and the renewable energy characteristics 20. The inputs may be processed through a transfer function in terms of cost of renewable energy versus time at an output 62. In FIG. 3b, output 62 is graphically shown in terms of cost versus time in hours into the future from the present moment of operation of system 10. Output 62 may go to the optimization algorithms module 55.

Energy storage equipment model 53 may have inputs of energy cost forecaster 12, rate of charge 44 and storage capacity 45. The inputs may be processed through a transfer function in terms of cost of stored energy versus time at an output 63. In FIG. 3c, output 63 is graphically shown in terms of cost versus time in hours into the future from the present moment of operation of system 10. Output 63 may go to the optimization algorithms module 55.

Energy grid model 54 may have inputs of energy cost forecaster 12, time of use rate 41 and demand limit 42. The inputs may be processed through a transfer function in terms of cost of grid energy versus time at an output 64. In FIG. 3d, output 64 is graphically shown in terms of cost versus time in future hours of the operation system 10. Output 64 may go to the optimization algorithms module 55.

Outputs 61, 62, 63 and 64 may be processed with algorithms in module 55 for optimized results in terms of energy cost, carbon footprint, and/or other criteria, or a combination of these criteria, as needed or desired. The processing for module 55 may be provided by a processor 40. Processor 40 may provide processing for the inputs via transfer functions for attaining outputs of models 51, 52, 53 and 54, as shown by line corrections between processor 40 and the models.

Figure 3E:
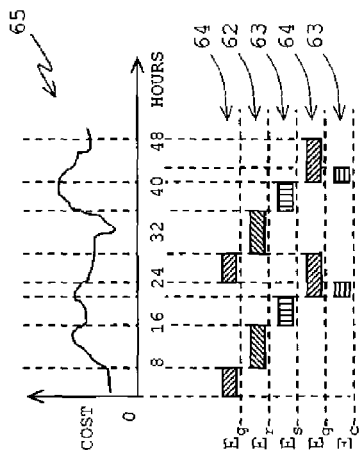
FIGS. 3a, 3b, 3c, 3d and 3e are graphs of outputs of significant components of the optimizer.
Figure 3A:
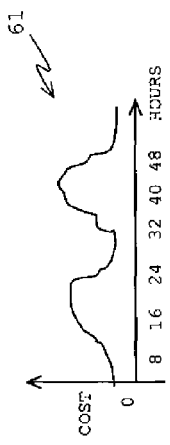
Figure 3B:
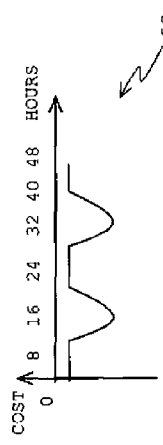
Figure 3C:
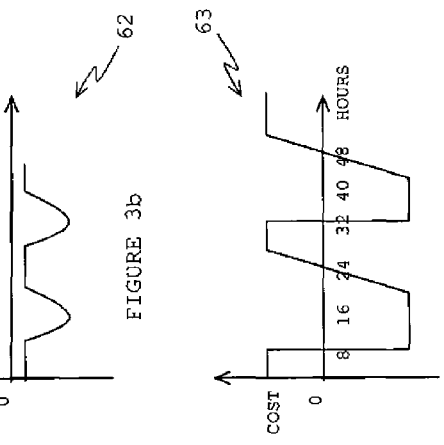
Figure 3D:
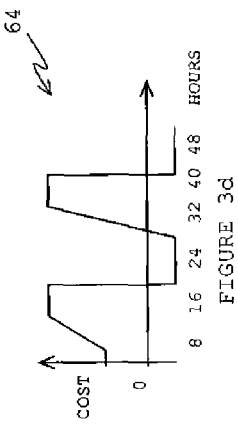

Output 65 from module 55 may be shown graphically by FIG. 3e. The output is shown in terms of projected cost for the next 48 hours. Contributions of the various outputs 62, 63 and 64 from the models for various portions of the 48 hours are shown with a bar graph in conjunction with the curve representing a culminating output 65 from module 55. The shaded areas indicated by arrows 64 are usage of grid energy. The shaded areas indicated by arrow 62 are usage of renewable energy. The shaded areas indicated by arrows 63 show energy taken from storage (upper arrow) and energy put into storage (lower arrow). The end result 65 of module 55 may include an optimal scheduling of energy assets. Output 65 may be converted into control signals by processor 40 which may be sent out on lines 31 and 32 to control mechanisms 22 and 23, respectively, of system 10, to achieve an optimization of energy costs, carbon footprint, and so on, as desired or needed by the user.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An energy optimization system for optimizing energy use by a facility and/or a building, the system comprising:
an energy storage device having at least one energy storage characteristic;
an optimizer;
an energy cost forecaster connected to the optimizer, the energy cost forecaster configured to provide forecast rate information about energy received from different energy sources for a particular duration; and
a load forecaster connected to the optimizer, wherein the load forecaster forecasts the load of the facility and/or the building, at least in part, using a weather forecast for an area near the facility and/or the building;
a first mechanism for moving energy between a renewable energy source, an electrical grid, a facility and/or building load and the energy storage device;
a second mechanism for moving energy between the electrical grid, the energy storage device and the facility and/or building load; and
wherein the optimizer is for coordinating the movement of energy through one or more lines by controlling the first mechanism to move amounts and kinds of energy between the renewable energy source, the electrical grid, the energy storage device and the load and for controlling the second mechanism to move amounts and kinds of energy between the electrical grid, the energy storage device and the facility and/or building load and wherein the optimizer controls the first mechanism and the second mechanism based on a criterion or criteria including the at least one energy storage characteristic of the energy storage device, the forecast rate information, and the forecast load of the facility and/or building.

2. The system of claim 1, wherein:
the optimizer has a control connection to the renewable energy source.

3. The system of claim 2, further comprising:
a conventional energy source connected to the electrical grid; and
wherein the optimizer has a control connection to the conventional energy source.

4. The system of claim 3, wherein:
the optimizer has a control connection to the energy storage component; and
the criterion or criteria comprise cost, carbon footprint, or a combination of cost or footprint.

5. The system of claim 1, wherein the energy storage component is controlled by the optimizer.

6. The system of claim 5, wherein:
the electrical grid includes at least one conventional energy source;
the energy cost forecaster is for forecasting a rate of cost for conventional energy and a rate of cost for renewable energy; and
the load forecaster is for forecasting an amount of load.

7. The system of claim 6, wherein:
the optimizer is for controlling an amount of renewable energy to be used, an amount of conventional energy to be used, and/or an amount of energy to be stored, in order to provide an amount of energy to be used for the load at the criterion or criteria; and
the criterion or criteria comprise cost or a footprint, or a combination of cost and footprint.

8. The system of claim 7, wherein the amount of energy to be used for the load is for a given duration of time.

9. The system of claim 8, wherein:
the criterion is cost; and
an optimized criterion is a minimum cost of energy to be used for the given duration of time for the load.

10. The system of claim 9, wherein the amount of load forecasted is based on occupancy forecast of the facility and/or building and characteristics of the load.

11. An energy optimizer system comprising:
an energy storage device having an energy storage characteristic;
a junction for receiving energy from two or more energy sources including a conventional energy source and a renewable energy source, wherein the energy sources are capable of providing energy to the load and/or the energy storage device;
an optimizer;
an energy cost forecaster connected to the optimizer, the energy cost forecaster configured to provide forecast rate information about energy received from different energy sources for a duration up to 48 hours into the future;

a load forecaster connected to the optimizer; and wherein the optimizer has an output for indicating amounts of energy from the two or more energy sources needed for a forecasted load at a magnitude of at least one criterion for a certain duration of time and an output for indicating amounts of energy from the energy storage device to be delivered to an electrical grid connected to the junction, wherein the energy delivered to the electrical grid corresponds to the same at least one criterion for the certain duration of time, and wherein the at least one criterion includes the energy storage characteristic.

12. The system of claim 11, further comprising:

a control mechanism connected to the output of the optimizer and to the two or more energy sources; and wherein the control mechanism is for controlling the amounts of energy from the two or more energy sources, as indicated by the output of the optimizer, to a load.

13. The system of claim 11, wherein the output of the optimizer is further for indicating an amount of energy to be added or removed from a storage component for the forecasted load at a magnitude of at least one criterion for a certain duration of time.

14. The system of claim 13, further comprising a control mechanism connected to the output of the optimizer, the two or more energy sources and the storage component.

15. The system of claim 14, wherein:
at least one criterion is cost; and
a best magnitude of the at least one criterion is lowest cost.

16. The system of claim 14, wherein:
at least one criterion is .a footprint; and
a best magnitude of the criterion is a smallest footprint.

17. A method for optimizing energy usage comprising:
forecasting a cost of a first energy;
forecasting a cost of a second energy;
forecasting a cost of a third energy associated with an energy storage device having at least one energy storage characteristic, wherein forecasting the cost of the third energy includes forecasting the cost of energy delivered to the load from the energy storage device, forecasting the cost of energy delivered to an electrical grid from the energy storage device, and forecasting the cost of the first energy and/or the second energy delivered to the energy storage device;
forecasting an amount of load; and
optimizing a first amount of the first energy, a second amount of the second energy, and third amount of the third energy for the amount of load using the at least one energy storage characteristic to obtain a least magnitude of a criterion of energy usage.

18. The method of claim 17, further comprising storing energy in the energy storage device to obtain the least magnitude of the criterion of energy usage.

19. The method of claim 18 wherein:
the first energy is a renewable energy;
the second energy is a conventional energy; and
the criterion is cost.

20. The method of claim 18, wherein:
the first energy is a renewable energy;
the second energy is a conventional energy; and
the criterion is carbon footprint.

21. The method of claim 17, further comprising delivering energy to the electrical grid from the energy storage device to obtain the least magnitude of the criterion of energy usage.

\* \* \* \* \*